UNITED STATES PATENT OFFICE.

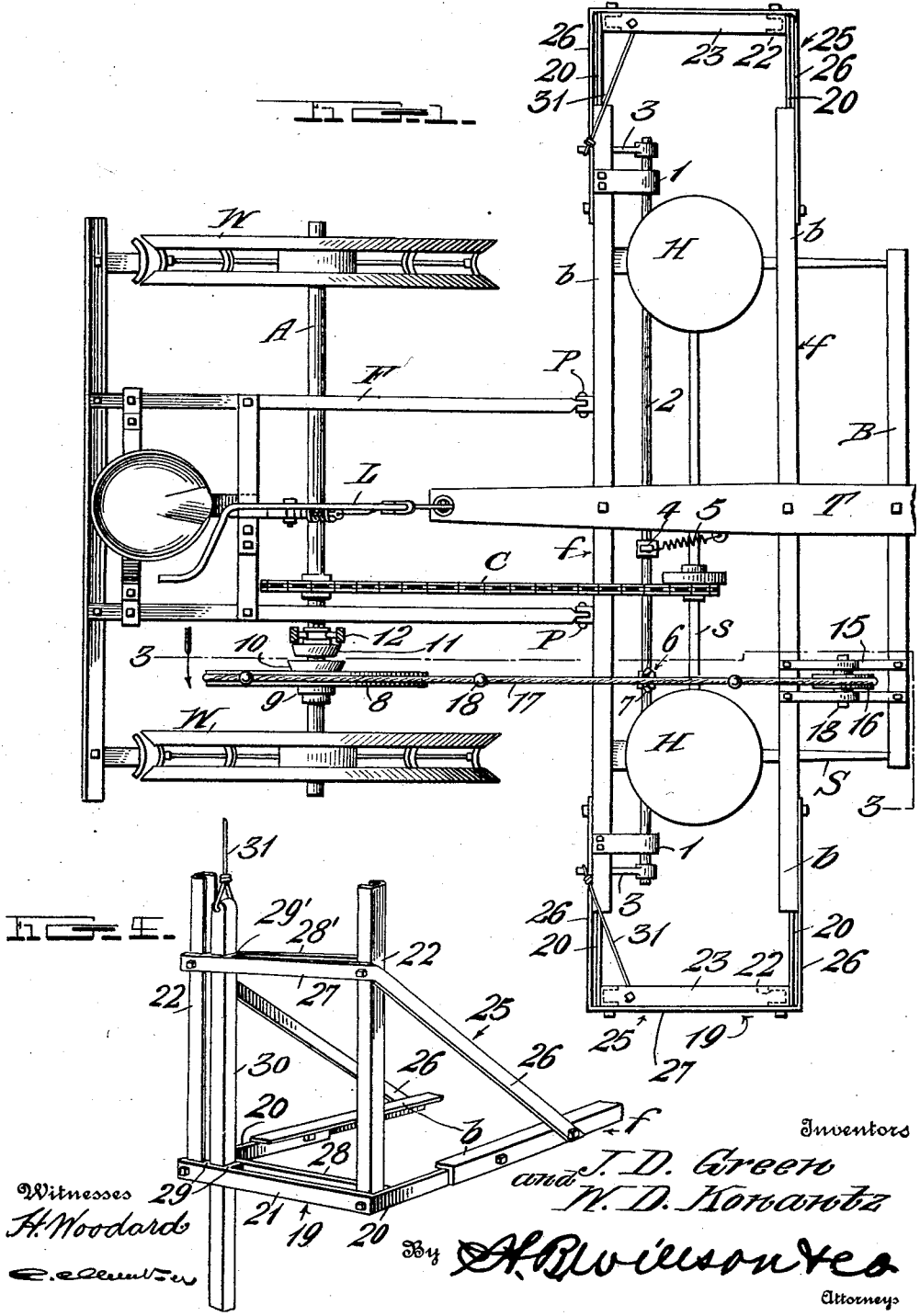

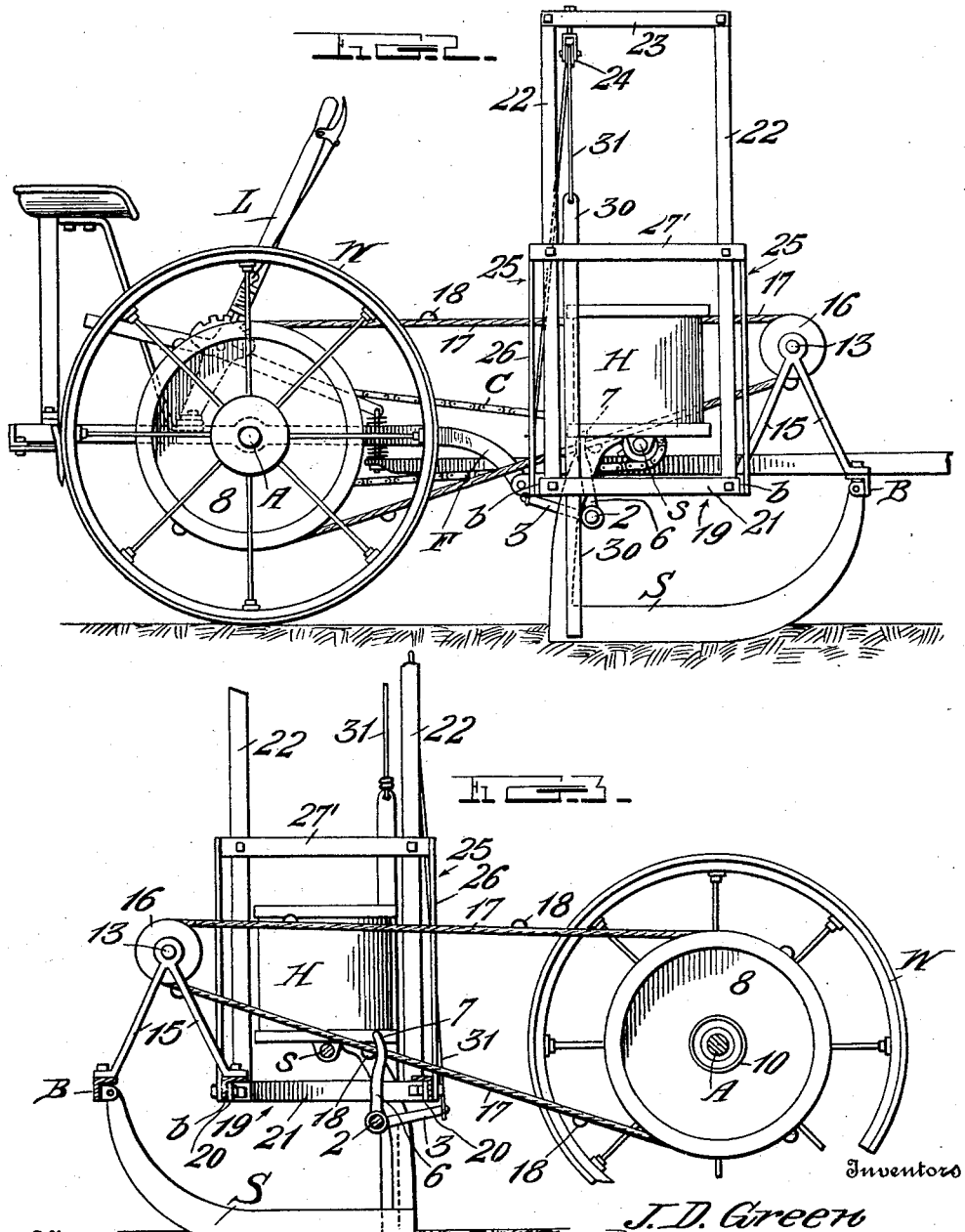

JAMES D. GREEN AND WALTER D. KONANTZ, OF ARCADIA, KANSAS.

MARKING AND CHECKING ATTACHMENT FOR CORN-PLANTERS.

1,111,223.  Specification of Letters Patent.  Patented Sept. 22, 1914.

Application filed February 12, 1914. Serial No. 818,298.

*To all whom it may concern:*

Be it known that we, JAMES DAVID GREEN and WALTER DAVID KONANTZ, citizens of the United States, residing at Arcadia, in the county of Crawford and State of Kansas, have invented certain new and useful Improvements in Marking and Checking Attachments for Corn-Planters; and we do declare the following to be a full, clear, and exact description of the invention, such as will enable others skilled in the art to which it appertains to make and use the same.

This invention relates to improvements in marking attachments for corn planters and the main object of the invention is to provide a simply constructed and efficient device of this character which will operate to great advantage and will eliminate the necessity of employing a wire stretched across the field, in order to properly check the corn.

Another object of the invention is to so construct our marking device as to render it applicable to corn planters of various constructions without sacrificing any of its advantages.

Still another object is to construct the marker in such a manner that a pair of straight lines will be marked throughout the length of the field, said lines being so spaced from the seed shoes that they may be used as guides on the return trip across the field.

It will be understood from the construction and arrangement hereinafter described that the straight lines above mentioned, will be broken opposite every hill of corn planted. The purpose of this will be also brought out in the body of the specification.

With the above objects in view, the invention resides in certain novel features of construction and combination herein described and claimed and shown in the drawings, wherein:—

Figure 1 is a plan view of a corn planter showing our improved markers applied thereto; Fig. 2 is a side elevation thereof. Fig. 3 is a vertical longitudinal section on the line 3—3 of Fig. 1; and Fig. 4 is a detail perspective view of one end of the hopper frame showing more clearly the construction of one of our markers and the method of attachment to said frame.

In the embodiment illustrated in the drawings, we have shown a corn planter comprising the usual supporting and driving wheels W connected by the supporting axle A upon which is mounted the main frame F of the planter. The usual hopper frame $f$ is pivoted at P to the forward end of the frame F, said hopper frame carrying the hoppers H, which deliver the seed to the seed shoes S, the delivery mechanism for said seed (not shown) being operated in a well-known manner through the action of the shafts which is driven in the usual manner from the axle A by means of a sprocket chain C. The front ends of the seed shoes S are connected by a transverse bar B to which and to the frame $f$ is bolted the tongue T, a lever L being connected to the rear end of said tongue for the purpose of raising and lowering the seed shoes, as is common in devices of this character.

Mounted in suitable brackets 1 depending from the side bars $b$ of the frame $f$ is a rock shaft 2 which carries rearwardly extending arms 3 on its opposite ends, said arms being rigidly secured to said shaft. A third arm 4 rises rigidly from the shaft 2 at a point near the tongue T and said arm 4 is yieldingly connected to said tongue by means of a coil spring 5. Disposed between the arm 3 at the right hand side of the machine and the arm 4, is a second upright arm 6, the upper end of which is curved transversely and bifurcated to form a fork 7.

Loosely mounted upon the axle A is a driving wheel 8 which bears at one side against a stop 9 and is provided on its opposite side with one member 10 of a clutch, the opposite member 11 of which is slidably keyed to the shaft A and is operated in the usual manner by the fork 12 of a clutch lever.

Revolubly mounted upon a shaft 13 supported by arms 15 which diverge and are respectively connected to the front bar $b$ of the frame $f$ and the transverse bar B, is a guide pulley 16, around which and the drive wheel 8, passes an endless wire cable 17 which is provided at suitable intervals with metal balls or tappets 18. As clearly shown in Fig. 3, the rearward stretch of the cable 17 passes through the fork 17 and the tappets 18 are disposed in such positions as to catch in said fork and rock the same rearwardly, thus locking the arms 3 downwardly for a purpose to appear.

Rigidly secured to the bars $b$ at each end of the frame $f$, is a laterally projecting U-shaped bracket 19, the arms 20 of which are bolted to said bars $b$ while their cross bars 21 are spaced considerable distances from the ends of said bars $b$. Rising from the points of connection between the arms 20 and the cross bars 21 of the brackets 19 are upright standards 22 which are connected at their upper ends by bars 23 from which depend guide sheaves 24. Other U-shaped frames 25 have their arms 26 secured to the bars $b$ while their cross bars 27 are bolted to the outer sides of the standards 22 at points approximately midway between the bars 21 and 23. Spaced from each cross bar 21 of the brackets 19 is a cross bar 28 which is secured to the inner sides of the standards 22, guide blocks 29 being disposed between said bars 21 and 28. Bars 28', similar to the bars 28, are secured to the standards 22 and spaced from the upper bars 27 of the bracing frames, guide blocks 29' being disposed between the bars 27 and 28'.

Mounted to slide in a vertical plane within the guides formed by the various cross bars and by the blocks 29 and 29' is a pair of marking rods 30, the lower ends of which normally contact with the soil being planted. The upper ends of the rods 30 are connected to cables 31 which pass over the sheaves 24 and are secured at their opposite ends to the arms 3. Thus it will be seen that when the shaft 2 is rocked as hereinbefore described, the marking rods 30 will be raised out of contact with the ground. This operation takes place simultaneously with the dropping of seed by the hoppers H and shoes S.

From the above described construction and operation, it will be clear that the lower ends of the rods 30 will mark the soil between the hills of corn, but will leave a gap directly opposite the points where the hills are planted. It will also be noted that the marking rods 30 are spaced from the shoes S a distance equal to half the space between said shoes. By this arrangement of parts, after planting the first two rows of corn across the field, it is simply necessary to turn the machine around, start the proper marking rod 30 in the mark made on the previous trip and continue back across the field thus dropping two more rows of corn, spaced the proper distances from the rows previously planted. By always maintaining the lower end of the marking rod 30 in the mark previously made, and being careful that said rod rises at precisely the same points it rose on its previous trip, the corn may be accurately checked in straight rows transversely of the field, as well as longitudinally thereof. Should it be noted that the marking rod 30 is lifted too soon, or not soon enough, the clutch may be thrown out and the drive wheel 8 may be turned by the foot of the operator until said rod is again in proper position, whereupon the clutch may again be thrown in and the machine may again be started.

Although we have described our invention with considerable minuteness, we do not wish to be limited to details of construction other than those amplified in the appended claims.

It will be understood that we could employ a sprocket chain in place of the cable 17 and that said chain would operate to equal advantage provided it, too, were supplied with proper tappets. In case the sprocket chain is employed, it will of course be understood that sprocket wheels will be employed in place of the grooved wheels 8 and 16.

Having thus described our invention, what we claim is:—

1. The combination with a planter, of marking bars mounted for a vertically sliding movement on said planter, a rock shaft journaled on said planter, rigid arms near the ends of said rock shaft, a fork rigidly secured to said shaft intermediate said arms, a guide on said planter, a drive wheel on the shaft of said planter, a flexible element passing around said drive wheel and said guide, a plurality of tappets on said flexible element, sheaves revolubly mounted above said marking rods, and flexible connecting elements passing over said sheaves and having their opposite ends connected to said marking rods and the arms on said rock shaft, the fork on said shaft straddling said flexible element.

2. The combination with a planter having a transverse hopper frame, of a U-shaped extension bracket having its arms secured to one end of said hopper frame, standards secured to the inner side of and rising from the cross bar of said bracket, a bar connecting the upper ends of said standards, a U-shaped bracing frame having its cross bar secured to the outer sides of said standards at points intermediate their ends, the arms of said frame inclining downwardly and being secured to said hopper frame, bars secured to the inner sides of said standards and lying in the planes of the cross bars of said bracket and said frame, spaced guide blocks disposed between said bars and the cross bars of said bracket and said frame, a marking rod slidably mounted between said guide blocks, and means for raising said marking rod at intervals.

In testimony whereof we have hereunto set our hands in presence of two subscribing witnesses.

JAMES D. GREEN.
WALTER D. KONANTZ.

Witnesses:
D. M. GREEN,
J. N. TAYLOR.

Copies of this patent may be obtained for five cents each, by addressing the "Commissioner of Patents, Washington, D. C."